Oct. 30, 1934.    C. A. ROEDER    1,979,080
TRANSMISSION GEARING
Filed Aug. 17, 1933    2 Sheets-Sheet 2
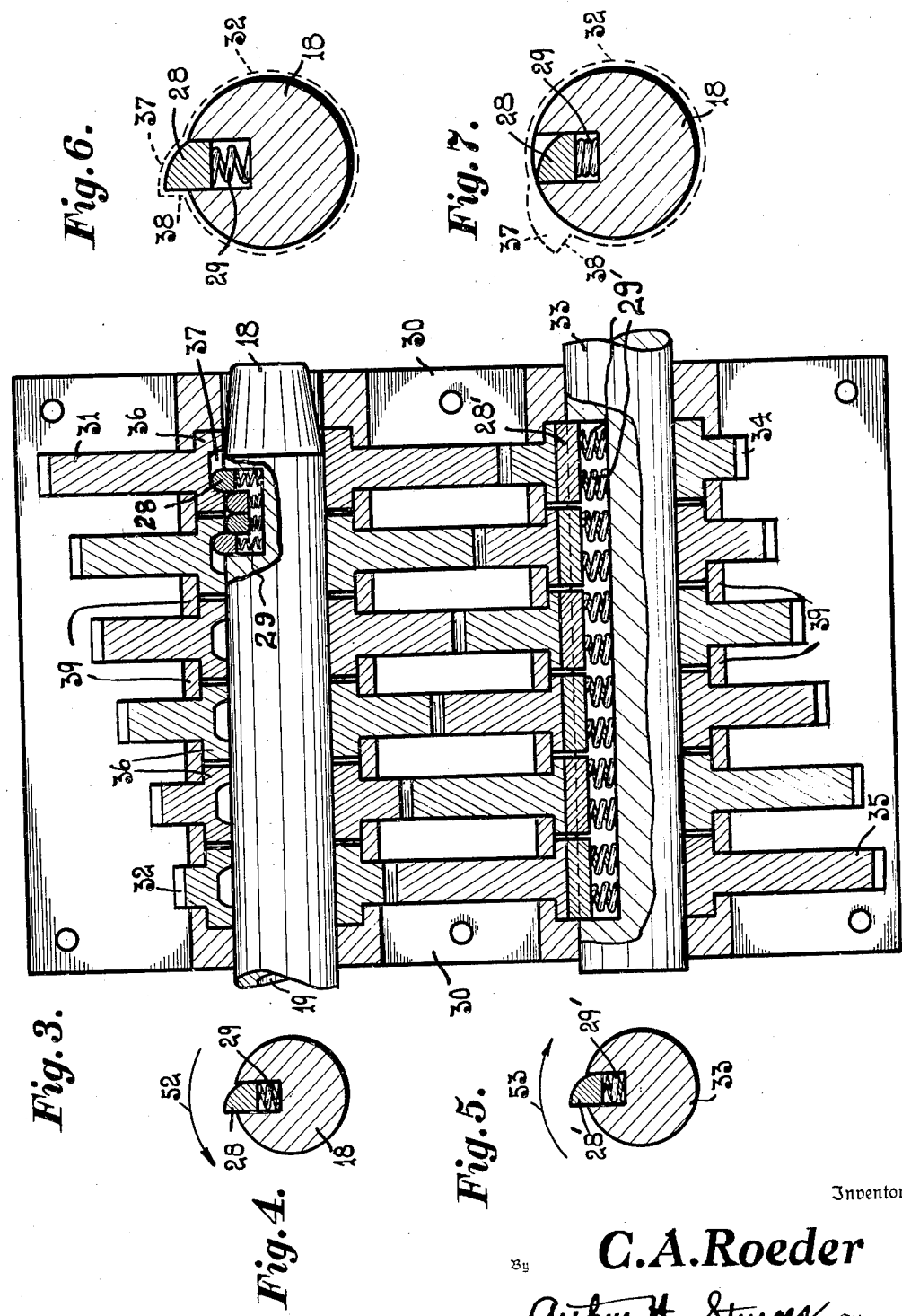
Inventor
C. A. Roeder
By Arthur H. Sturges  Attorney Patented Oct. 30, 1934

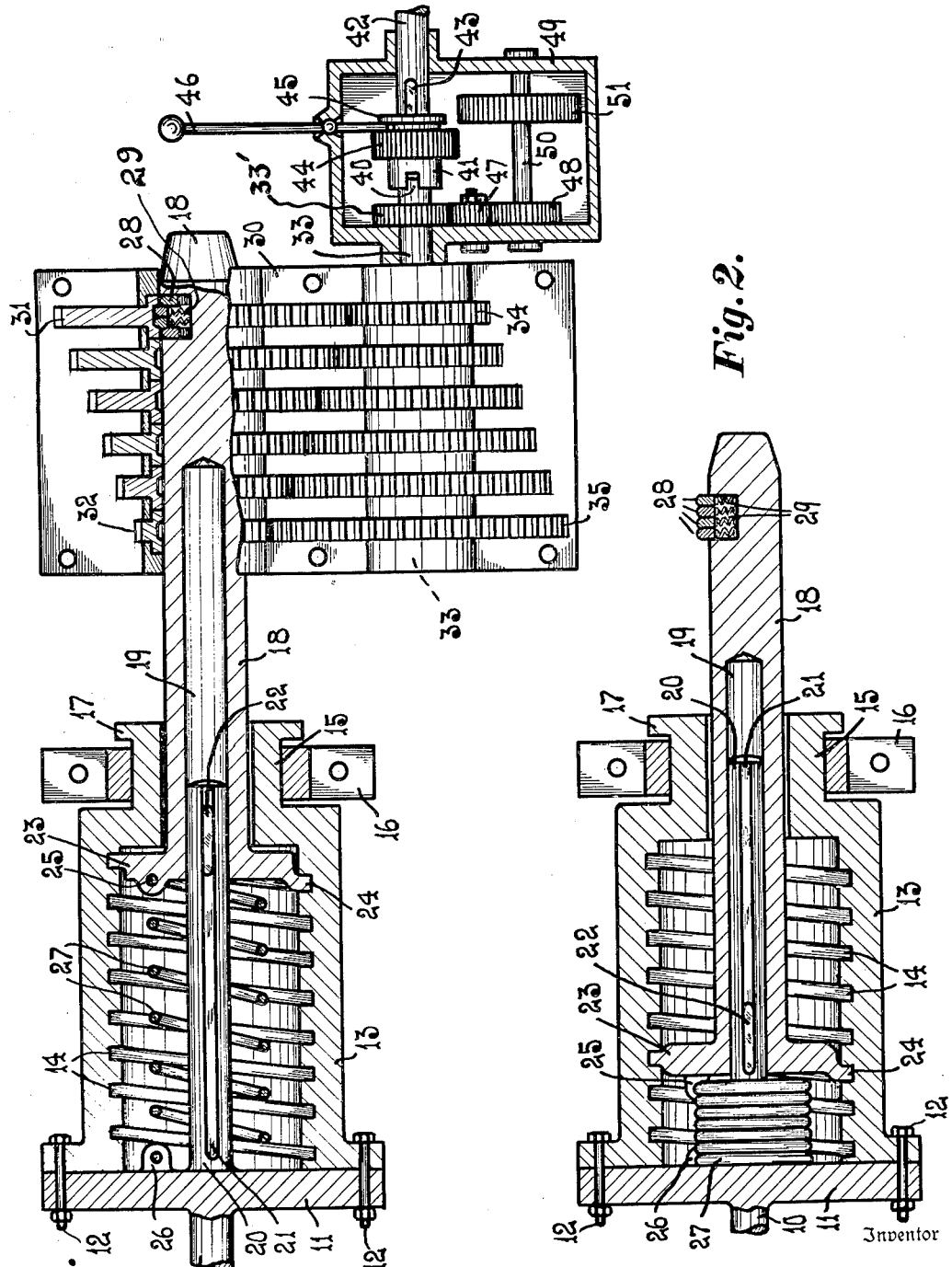

1,979,080

UNITED STATES PATENT OFFICE 1,979,080

TRANSMISSION GEARING

Clyde A. Roeder, Omaha, Nebr.

Application August 17, 1933, Serial No. 685,552

3 Claims. (Cl. 74—337)

This invention relates to transmission gearing particularly adapted for use in connection with motor vehicles and the like.

It is an object of the invention to provide means whereby the speed ratio or forward travel of a vehicle may be adjusted to compensate with the speed ratio or revolutions of the engine driving the vehicle without the necessity of manually or electrically shifting gears as heretofore practiced.

Another object of the invention is to provide means for facilitating the operation of motor vehicles and to cushion the shock or jar incident to the transfer of driving power to the traction wheels thereof.

Other and further objects and advantages of the invention will be apparent from the following detailed description thereof, reference being had to the accompanying drawings in which:

Figure 1 is a longitudinal view partially in section of power transmission mechanism embodying the present invention.

Figure 2 is a sectional view of certain parts of the mechanism shown in Figure 1, the winding spring thereof being in a contracted position.

Figure 3 is an enlarged sectional view of certain gears employed.

Figure 4 is a transverse sectional view of a driver sleeve, and

Figure 5 is a similar view of a driven shaft.

Figure 6 is an enlarged transverse sectional view of the sleeve shown in Figure 4 and illustrating the relative position of a pinion having a driving connection with a ratchet dog, and Figure 7 is a view similar to Figure 6 the dog being disengaged from the pinion.

Referring now to the drawings for a more particular description, 10 indicates the engine shaft carried by a conventional automobile engine or the like, not shown. The shaft is provided with a drum head 11, the latter being secured by means of bolts 12 to a drum 13 and it will be understood that at times when the engine shaft 10 rotates corresponding driving rotary movements are imparted to the drum 13.

The drum is cylindrical and hollow and provided with interior annular screw threads 14 and a restricted portion or neck 15 carried by a pillow block or bearing 16, the latter being suitably supported by the frame of the vehicle, the said neck being provided with a flange 17 for preventing longitudinal movements of the drum with respect to the journal bearing 16.

The neck 15 provides a journal mounting for a sleeve 18 which is adapted to have rotary movements in the neck and also longitudinal sliding movements with respect thereto. The sleeve 18 is provided with an elongated recess 19 adapted to slidingly receive and provide a mounting for a slotted shaft 20 which may be formed integral with the drum head 11. The slot 21 of the shaft 20 is adapted to slidingly receive a spline 22 and it will be understood that the spline or key 22 may be formed integral with, riveted to, or otherwise suitably secured, permanently to the sleeve 18 or to the plate head 23 of said sleeve.

The plate head 23 is provided with threads 24 for membering with the screw threads 14 of the drum 13, having an eye 25 or a like detent. A similar detent 26 is carried by the drum head 11 and between said detents 25 and 26 a windable spring 27 of helical type is secured.

The sleeve 18 is provided adjacent its end with a plurality of compressible ratchet dogs 28 which, as best shown in Figure 2, are normally urged outwardly beyond the perimeter of the sleeve by means of springs 29 but may be retired within the plane or body of the sleeve as shown in Figure 7.

The end of the sleeve 18 furthest from the motor is journalled in the end walls of a gear case 30, the top cover of the latter not being shown. The gear case may be supported from the frame of the vehicle by suitable braces, not shown. Preferably twelve pinions are housed within the case 30. The plurality of driver pinions carried by the driver sleeve 18 are each of a different diameter and aligned progressively thereon as to size; the smallest pinion 32 arranged closest to the motor is the low speed pinion, the pinion 31 of largest diameter is the high speed pinion and the remaining four pinions of the driver set are for intermediate speed purposes.

Each pinion carried by the driver sleeve 18 is in mesh at all times with an oppositely disposed driven pinion arranged on the driven shaft 33, said sleeve and shaft being disposed in parallelism with respect to each otther. The larger high speed pinion 31 of the sleeve meshed with the pinion 34 of the shaft comprises the high speed gear the one pinion being preferably not less than twice the diameter of the other. The low speed pinion 32 of the sleeve meshed with the pinion 35 of the shaft comprises the low speed gear.

The sets of pinions are loosely associated with their respective sleeve and shaft but may have a driving connection and successively engaged thereto at times and at other times are permitted to have idling movements thereon.

Referring to Figure 3 the pinions carried by the sleeve 18 are each provided with hubs 36 having recesses 37 disposed transversely of the hubs and interiorly thereof which, as best shown in Figure 7, are partially arcuate in cross section and each provided with a wall 38 disposed in substantial alignment with the axis of the sleeve, said recesses substantially corresponding in size and shape to the cross sectional contour of the ratchet dogs 28, the latter having rounded off side walls at their outer ends, the recesses 37, as shown in Figure 3, being substantially arched in contour at their ends and corresponding to the said rounded shape of the dogs 28 for facilitating the movements of the dogs in and out of engagement with the hubs of the pinions during sliding movements of the sleeve 18.

The pinions associated with the sleeve 18 are spaced apart and journalled within portions 39 of the housing or gear case 30. The housing 30 and its cover are of two piece separable construction, the pinions of both sets of gears projecting through slots positioned between the spaced apart portions 39 of the housing and its cover. The pinions associated with the driven shaft 33 are spaced apart by means of similar housing portions 39. For each pinion carried on the driven shaft 33 a ratchet dog 28' is provided normally urged outwardly by springs 29'. Preferably four dogs are employed for the pinions of the slidable driver sleeve 18. The extreme outward movement of the sleeve 18 is shown in Figure 1 and at such position two dogs 28 may engage the high speed pinion 31 for a driving thereof.

The driven shaft 33 is provided at its rear end with a key 40 adapted to be received, at times, within a correspondingly slotted collar 41, carried by a shaft 42. The collar 41 is adapted to have sliding movements on the shaft 42 and rotatably locked thereto by means of a feather 43. The collar 41 is integral with a gear wheel 44, having a flange 45 for receiving therebetween the bifurcated end of a shifting lever 46. The shaft 42 is in communication with and adapted to drive the rear wheels of the vehicle when the shafts 33 and 42 are engaged for driving movements. An idler pinion 47, and a pinion 48 in mesh therewith are carried in the reverse gear housing 49, the latter pinion being mounted on a jack shaft 50 which is provided with a pinion 51, the latter being adapted to be put in mesh with the gear wheel 44 by the shifting lever 46, it being understood that the position of the parts shown in Figure 1 is so arranged for driving the vehicle forwardly and that the lever 46 may be shifted for moving the vehicle rearwardly, the motion being communicated through the pinion 33' on the shaft 33 within the case 49.

In operation when the vehicle is stationary the dogs 28 of the sleeve 18 are engaged with the high speed pinion 31, the spring 27 having extended the dogs and sleeve to that position and upon an initial starting of the motor the threads 14 of the drum 13 cause the sleeve 18 to move towards the drum head 11 by means of the engagement of the threads 24 of the plate head with the threads 14 of the drum, the rotary movements imparted by the motor to the engine shaft 10 and drum 13, the sleeve 18 being locked as to rotary movements, at this time, by means of its engagement, through the dogs 28, with the high speed pinion, the latter being immovable, at this time, as to rotary movements, being in mesh with the pinion 34 and the latter locked to the driven shaft 33 which in turn is held immovable by the traction wheels of the vehicle, the wheels being engaged to the ground or roadway holding the high speed pinion 31 stationary through the pinion 34, the reverse gear shifting lever 46 being at this time in the position shown in Figure 1.

At this time the rotary movement of the drum head 11 imparts similar movements to the slotted shaft 20 causing the sleeve 18 to move longitudinally toward the drum head and slidingly but not rotatably as to the sleeve 18, it being prevented from rotating by means of the dogs 28 and high speed pinion 31. As the sleeve 18 moves toward the motor the dogs 28 are dragged through adjacent pinions away from the pinion 31 toward the pinion 32 the spring 27 becoming compressed.

When the spring 27 is completely compressed, as shown in Figure 2, the shaft 18 then rotates with the drum, the dogs 28 are then engaged with the lower speed pinions or lowest speed pinion 32, the vehicle starting forward at this time, sufficient leverage being provided by means of the low speed pinion 32, the traction wheels of the vehicle now starting to rotate.

After the vehicle has started forward momentum and impetus is imparted thereby relaxing the spring 27 which pushes the then rotating sleeve 18 rearwardly whereby the dogs 28 become successively engaged in higher speed pinions of greater diameter than the pinion 32, and the operation is continued until the vehicle is traveling in high gear using the pinion 31 as a high speed driver.

It will be noted that the set of pinions loosely mounted on the sleeve 18 are all of different diameters, the perimeter of the larger pinions necessarily rotating faster than the smaller pinions. The ratchet dogs 28 will permit a slower rotating pinion of the set to slip over a dog 28 then engaged therewith, the dogs being compressed into their slots as shown in Figure 7 wherein the low speed pinion 32 is represented by dotted lines. By this means a ratchet arrangement is provided and it will be understood that, as shown in Figure 4, when the sleeve 18 is rotated in the direction of the arrow 52 that the straight side wall of the dog 28 will engage against the wall 38 of the pinion, as shown in Figure 6, thereby causing said pinion to rotate with and receive driving motion from the sleeve 18. It is obvious that should the pinion 32 start to rotate at a different ratio than the sleeve 18 that it may overrun the dog 28 as shown in Figure 7. Thus when the pinion 32 is driven faster than the sleeve 18 by means of the pinion 35 meshed therewith on the driven shaft 33 the ratchet arrangement provides compensation for permitting the same.

Referring to Figure 5, the arrow 53 indicates the direction of travel of the driven shaft 33 which moves in the reverse direction to the sleeve 18. The driven and driving movements of the set of pinions carried by the driven shaft 33 are also in the direction of the arrow 53 each of said pinions being permitted to have idling movements in a reverse direction to the arrow 53 by means of the ratchet connection 28' of each to the driven shaft, two springs 29' may be employed for each ratchet dog 28' for normally urging the latter outwardly of their receiving slots provided on the shaft 33. The dogs 28' engage their adjacent pinions within slots provided in the hubs of the driven pinions said slots being of substantially the same shape as the dogs and extending completely through and transversely of the hubs. The dogs 28' are not shiftable from one pinion to another as heretofore explained relative to the dogs 28 of the slidable sleeve 18.

From the foregoing description it is thought to be obvious that a transmission gearing constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish it to be understood as limiting myself to the precise arrangement and formation of the several parts herein shown in carrying out my invention in practice except as herein claimed.

I claim:—

1. A variable speed power transmission for a motor vehicle and the like comprising a drum provided with a head for receiving revoluble movements from the motor and provided with a screw thread and a slotted shaft disposed centrally and longitudinally of the drum, a slidable sleeve journalled in the drum having an elongated recess for receiving the slotted shaft, a spline on the sleeve in register with said slot, a screw thread on the sleeve in register with the thread of the drum, a compressible outwardly urged ratchet dog associated with the sleeve, a spring between and connected to said head and sleeve, a set of driver pinions of varying diameters rotatably supported axially of said sleeve and independently thereof and aligned progressively as to size with the smallest thereof closest to the drum arranged for successive engagement by the ratchet dog of the sleeve whereby said pinions will be progressively rotated with the sleeve and permitting idling movements of said pinions not engaged by the dog, a set of oppositely disposed pinions in mesh with the driver pinions loosely arranged upon a shaft, individual ratchet dogs for the oppositely disposed pinions connected to the shaft and arranged for individual driving connections between the shaft and said oppositely disposed pinions, and an operative connection between the shaft and the traction wheels of the vehicle.

2. A variable speed transmission gearing for a motor vehicle and the like comprising a plurality of aligned driver pinions of various diameters arranged progressively as to size with the smallest pinion closest to the motor, said driven pinions having alined bores each provided with a recess, a plurality of pinions in mesh with the driver pinions and reversely arranged as to size with respect to the driver pinions, ratchet dogs supported within the bores of the driver pinions and arranged to be shifted to an engagement with the smallest pinion thereof upon an initial operation of the motor, said dogs permitting free rotation of the pinions in one direction, spring means for shifting the dogs to driver pinions of greater size subsequent to an initial operation of the motor, ratchet means for the pinions meshed with the driver pinions for a driving connection with the vehicle, said ratchet means and ratchet dogs arranged to have a vehicle driving connection with their pinions when the latter are rotated for driving the vehicle and idling movements when not engaged for vehicle driving movements.

3. A variable speed transmission gearing for a motor vehicle and the like comprising a plurality of axially alined driver pinions of various diameters arranged progressively as to size, said driver pinions having alined bores each provided with a dog engaging recess, driven pinions meshing with the driver pinions, a member loosely engaging within the bores of the driver pinions and slidable axially of the bores, pairs of ratchet dogs carried by said member for engagement within a recess of a selected pinion, said dogs permitting free rotation of said driver pinions in one direction, said dogs being so arranged whereby upon longitudinal movement of said member from one pinion to another at least two driver pinions will be engaged by said dogs and the larger of said driver pinions rotating said driven pinions at increased speed and the smaller of said driver pinions idling, automatic means for longitudinally shifting said member, a driven shaft loosely engaging within said driven pinions, and coacting means carried by said driven shaft and said driven pinions to permit idling movement of said driven pinions in one direction.

CLYDE A. ROEDER.